United States Patent

Blanchard

[11] Patent Number: 5,822,908
[45] Date of Patent: Oct. 20, 1998

[54] FISH NETTING DEVICE

[76] Inventor: Anthony P. Blanchard, 412 Orchard St. W., St. Clair, Mich. 48079

[21] Appl. No.: 796,936

[22] Filed: Feb. 7, 1997

[51] Int. Cl.$^6$ .................................................. A01K 77/00
[52] U.S. Cl. ...................................................... 43/11; 43/7
[58] Field of Search ............................ 43/7, 11, 12, 134; 119/245, 264, 201, 219; 56/337

[56] References Cited

U.S. PATENT DOCUMENTS

| | | | |
|---|---|---|---|
| 213,105 | 3/1879 | Greenwood | 43/134 |
| 771,362 | 10/1904 | Ellsworth | 43/11 |
| 1,750,163 | 3/1930 | Disneyi | 43/134 |
| 2,619,755 | 12/1952 | Henson | 43/12 |
| 2,653,403 | 9/1953 | Oslund | 43/11 |
| 4,272,906 | 6/1981 | Liebling | 43/11 |
| 4,446,646 | 5/1984 | Van't Veld | 43/12 |
| 4,477,993 | 10/1984 | Woermbke | 43/11 |
| 5,501,026 | 3/1996 | Bryant | 43/11 |

FOREIGN PATENT DOCUMENTS

| | | | |
|---|---|---|---|
| 28348 | 12/1911 | United Kingdom | 43/11 |
| 1533695 | 11/1978 | United Kingdom | 43/11 |

*Primary Examiner*—Kurt Rowan

[57] ABSTRACT

A fish netting device including a frame member with a handle. Included is a first net member that defines a pocket configuration, when interconnected to the frame member. A rider bracket is positioned within the frame and capable of sliding back and forth within the frame. A second net member has a first portion that is interconnected with the frame and a second portion interconnected with the rider bracket. Lastly, the handle has a guide slot and a channel. The channel has a means for moving the rider bracket back and forth. The means has a lever positioned within the guide slot for controlling the movement of the rider bracket.

1 Claim, 3 Drawing Sheets

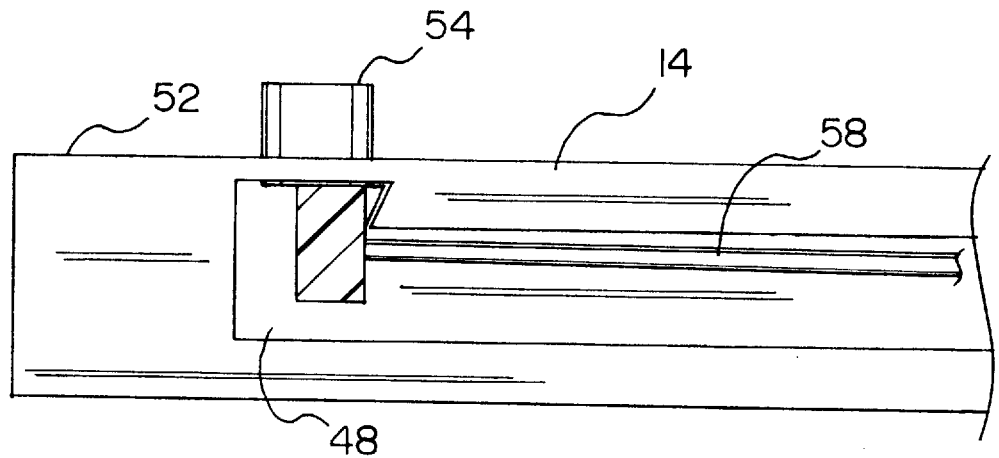
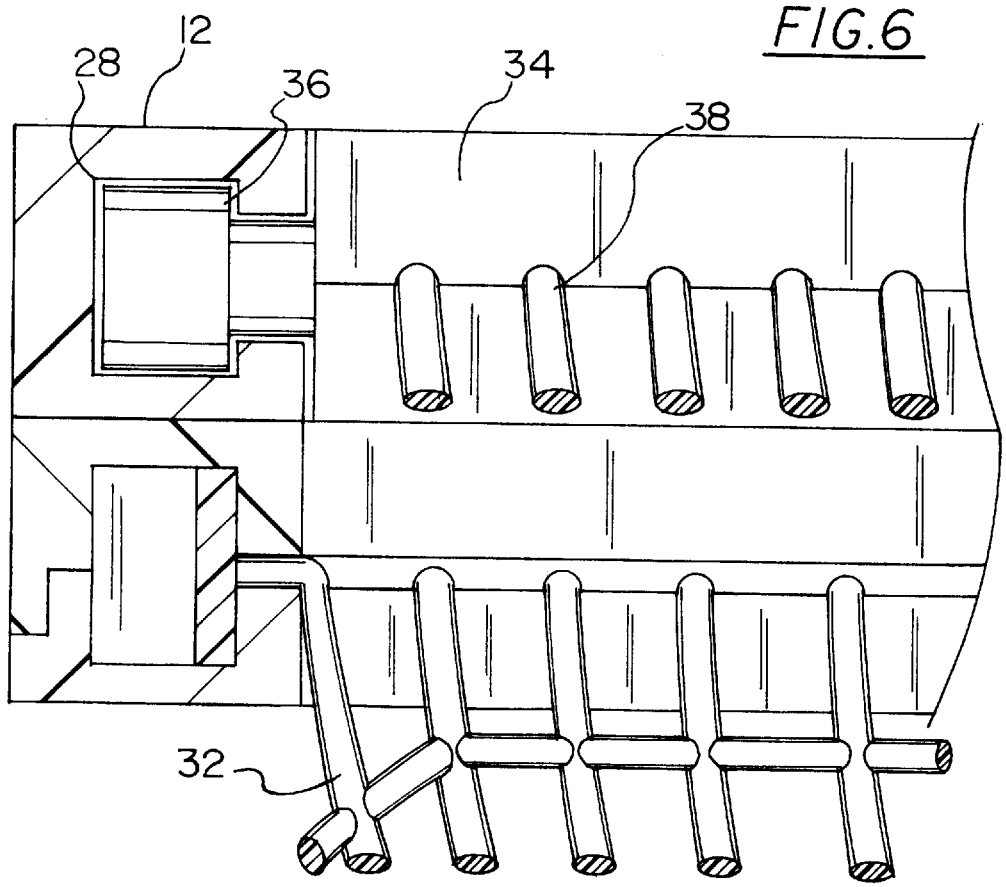

FISH NETTING DEVICE

BACKGROUND OF THE INVENTION

1. Field of the Invention

The present invention relates to a fish netting device and more particularly pertains to providing a fish net that enables an aquarium owner to easily capture fish and eliminate the ability of the fish from jumping out of the net while transporting them from one location to the other.

2. Description of the Prior Art

The use of an aquarium fish net is known in the prior art. More specifically, aquarium fish nets heretofore devised and utilized for the purpose of netting fish are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,932,150 to Sher discloses a scoop net for catching fish. U.S. Pat. No. Des. 273,409 to Willinger discloses a combined aquarium fish net and support. U.S. Pat. No. 4,392,570 to Willinger discloses an aquarium net assembly and packaging therefore. U.S. Pat. No. 4,251,938 to Goldman et al. discloses an aquarium fish net. U.S. Pat. No. 4,125,956 to Killian discloses a dip net for fish and the like. Lastly, U.S. Pat. No. 4,063,380 to Grim discloses a no-stress dip net.

While these devices fulfill their respective, particular objectives and requirements, the aforementioned patents do not describe fish netting device that allows fish to be scooped into a net device that has a top portion to eliminate fish from escaping from the net during relocation of the fish from one aquarium tank to another.

In this respect, the fish netting device according to the present invention substantially departs from the conventional concepts and designs of the prior art, and in doing so provides an apparatus primarily developed for the purpose of fish net that enables an aquarium owner to easily capture fish and eliminate the ability of the fish from jumping out of the net while transporting them from one location to the other.

Therefore, it can be appreciated that there exists a continuing need for a new and improved fish netting device which can be used for fish net that enables an aquarium owner to easily capture fish and eliminate the ability of the fish from jumping out of the net while transporting them from one location to the other. In this regard, the present invention substantially fulfills this need.

SUMMARY OF THE INVENTION

In view of the foregoing disadvantages inherent in the known types of aquarium fish nets now present in the prior art, the present invention provides an improved fish netting device. As such, the general purpose of the present invention, which will be described subsequently in greater detail, is to provide a new and improved fish netting device and method which has all the advantages of the prior art and none of the disadvantages.

To attain this, the present invention essentially comprises a generally rectangular frame member with a handle. The frame member has a front portion, a rear portion and a pair of side portions. The rear portion of the frame has an opening therein and centrally aligned with the handle. The frame member has an interior periphery. The interior periphery of the pair of side portions, each have an elongated track with the track extended from the front portion to the rear portion. A first net member is composed of water permeable material intertwined and is included. The first net member that defines a pocket configuration when interconnected to the frame member. A linear rider bracket is included. The linear rider bracket has a pair of end portions. The rider bracket is positioned within the frame with each end portion positioned within the track of one of the pair of side portions. The rider bracket is parallel the front and rear portions of the frame. The rider bracket is capable of sliding within the track of the frame to alternate its position adjacent the rear portion and the rear portion. A second net member is provided. The second net member is also composed of water-permeable material intertwined. The second net member has a first portion interconnected with the rear portion of the frame. The second net member has a second portion interconnected with the rider bracket. The second net member is capable of forming a pocket cover, when the rider bracket is positioned adjacent the front portion. Lastly, the handle has a guide slot and a channel. The guide slot is within a top side of the handle and opens into the channel. The channel is extended from the guide slot to the opening of the frame. A means for moving the rider bracket back and forth is positioned within the channel. The means has a lever positioned within the guide slot for controlling the movement.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fish netting device which has all of the advantages of the prior art aquarium fish nets and none of the disadvantages.

It is another object of the present invention to provide a new and improved fish netting device which may be easily and efficiently manufactured and marketed.

It is further object of the present invention to provide a new and improved fish netting device which is of durable and reliable constructions.

An even further object of the present invention is to provide a new and improved fish netting device which is susceptible of a low cost of manufacture with regard to both materials and labor, and which accordingly is then susceptible of low prices of sale to the consuming public, thereby making such fish netting device economically available to the buying public.

Even still another object of the present invention is to provide a fish netting device for fish net that enables an aquarium owner to easily capture fish and eliminate the ability of the fish from jumping out of the net while transporting them from one location to the other.

Lastly, it is an object of the present invention to provide a new and improved fish netting device including a frame member with a handle. Included is a first net member that defines a pocket configuration, when interconnected to the frame member. A rider bracket is positioned within the frame and capable of sliding back and forth within the frame. A second net member has a first portion that is interconnected with the frame and a second portion interconnected with the rider bracket. Lastly, the handle has a guide slot and a channel. The channel has a means for moving the rider bracket back and forth. The means has a lever positioned within the guide slot for controlling the movement of the rider bracket.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cut-away cross sectional view of the lever taken along line 5—5 of FIG. 4.

FIG. 6 is a cross sectional view of the present invention taken along line 6—6 of FIG. 3.

The same reference numerals refer to the same parts through the various Figures.

DESCRIPTION OF THE PREFERRED EMBODIMENT

Figure 1:
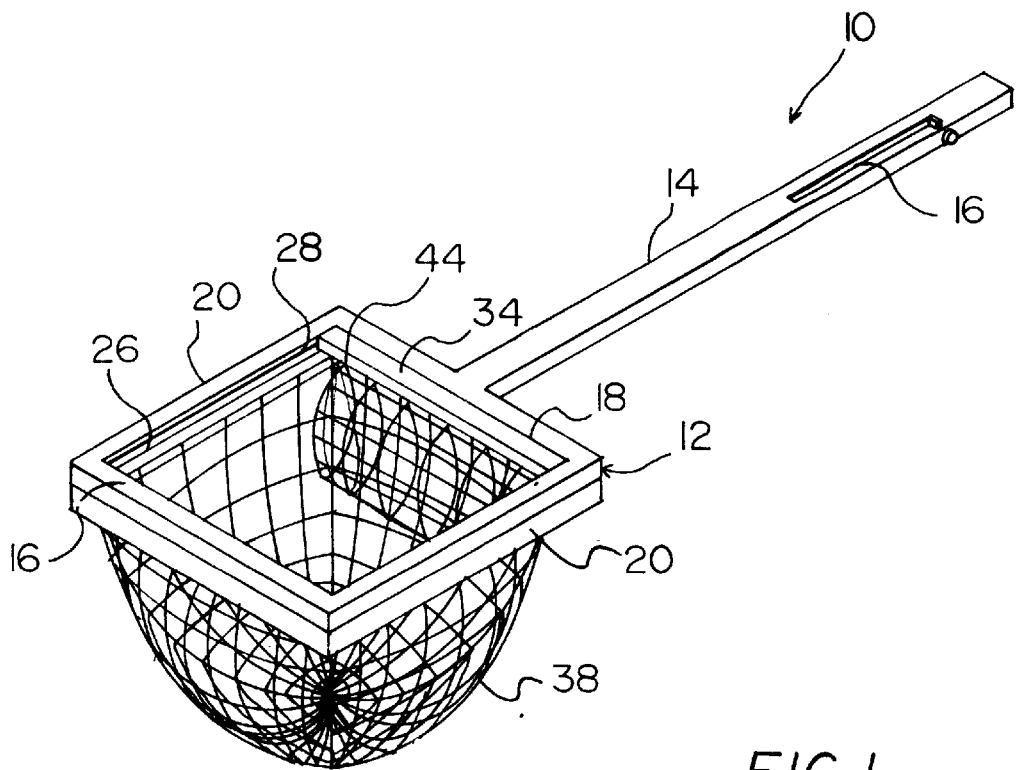
FIG. 1 is a perspective view of the preferred embodiment of the fish netting device constructed in accordance with the principles of the present invention.

With reference now to the drawings, and in particular to FIG. 1 thereof, the preferred embodiment of the new and improved fish netting device embodying the principles and concepts of the present invention and generally designated by the reference numeral 10 will be described.

The present invention, the fish netting device 10 is comprised of a plurality of components. Such components in their broadest context include a frame, a handle, a pair of net members, and a rider bracket. Such components are individually configured and correlated with respect to each other so as to attain the desired objective.

Figure 2:
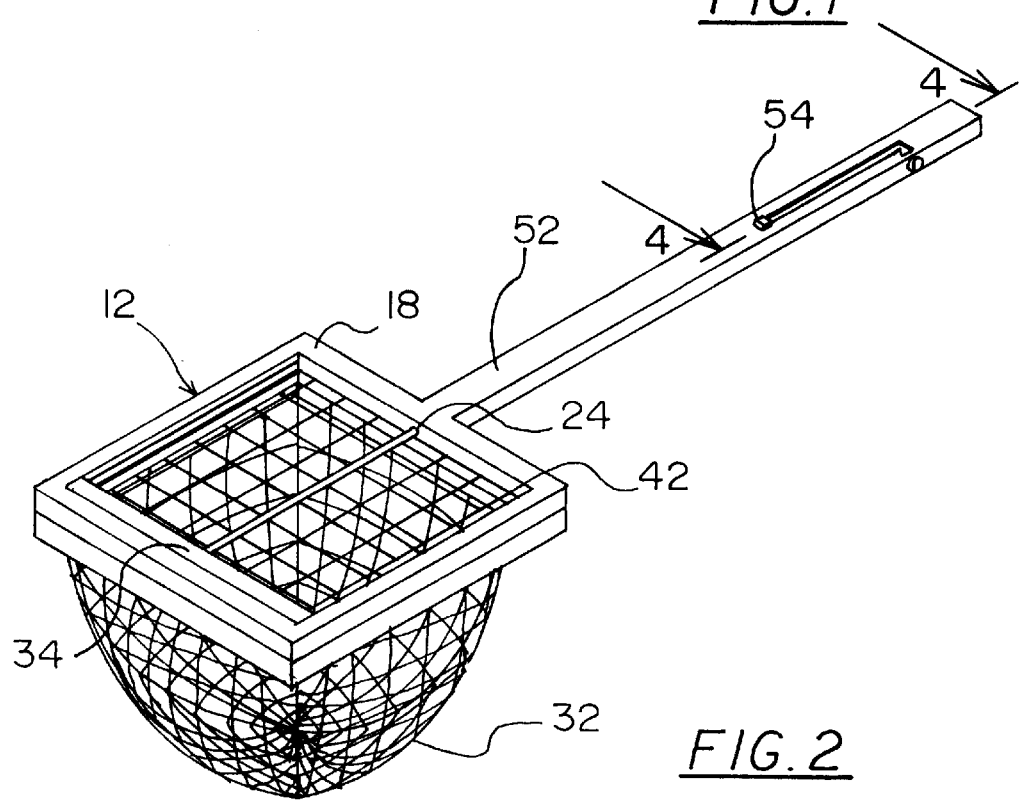
FIG. 2 is an isometric view of the present invention of FIG. 1 in an operable configuration.

Specifically, the present invention includes a generally rectangular frame member 12 with a handle 14. The frame member and handle are made of plastic. The frame member has a front portion 16, a rear portion 18 and a pair of side portions 20, as shown in FIG. 1. The rear portion of the frame has an opening 24, as seen in FIG. 2, that is centrally aligned with the handle. The frame member has an interior periphery 26. The interior periphery of the pair of side portions each have an elongated track 28 therein. The track is extended from the front portion to the rear portion of the frame member.

Figure 3:
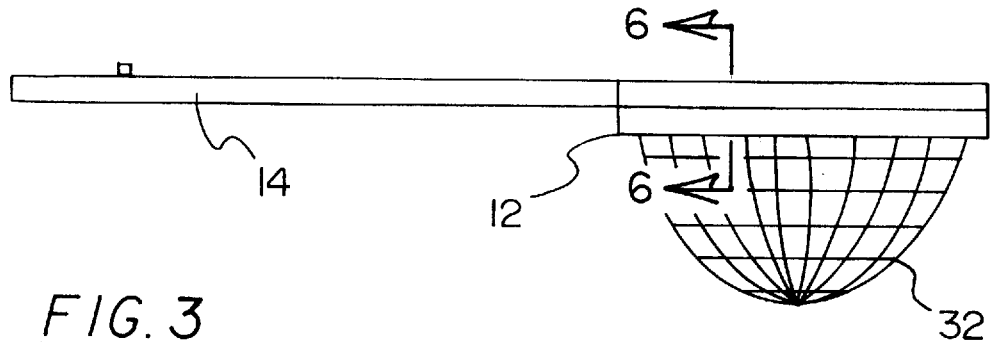
FIG. 3 is a side elevational view of the present invention.

Also, a first net member 32 is provided. The first net member is composed of water permeable material that are intertwined. The first net member defines a pocket configuration, as seen in FIG. 3, when interconnected to the frame member 12.

Additional, a linear rider bracket 34 is included. The rider bracket has a pair of end portions 36. The rider bracket is positioned within the frame 12. Each end portion is positioned within the track 28 of one of the pair of side portions 20. FIG. 6 shows one of the end portions within the track. The rider bracket is parallel the front 16 and rear 18 portions of the frame. The rider bracket slides within the track 28 of the frame for alternating its position to be adjacent the rear portion or adjacent the rear portion. The rider bracket is formed of a self lubricating plastic.

As best illustrated in FIG. 1, a second net member 38 is provided. The second net member is composed of water-permeable material intertwined. The second net member has a first portion 42 that is interconnected with the rear portion 18 of the frame member. The second net member has a second portion 44 that is interconnected with the rider bracket 34. The second net member forms a pocket cover, when the rider bracket is positioned adjacent the front portion, as shown in FIG. 2.

Figure 4:
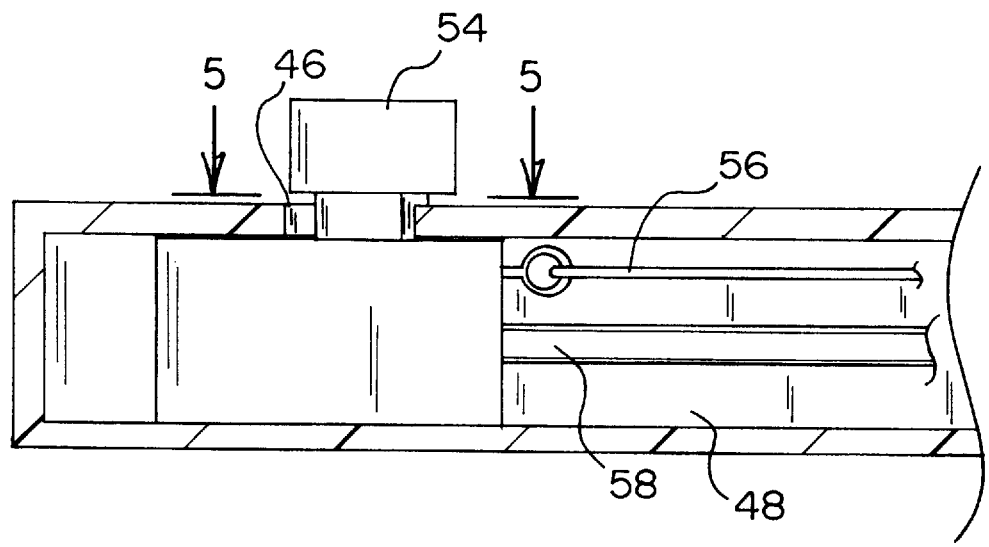
FIG. 4 is a cut-away cross sectional view of the present invention taken along line 4—4 of FIG. 3.

Lastly, the handle 14 has a guide slot 46 and a channel 48, as shown in FIG. 4. The guide slot is within a top side 52 of the handle and opens into the channel, as shown in FIG. 5. The channel extends from the guide slot to the opening 24 of the frame 12.

Furthermore, a means for moving the rider bracket back and forth within the channel is included. The means has a lever 54 that is positioned within the guide slot. The lever has an elastic member 56 and a push rod 58. The push rod, of FIG. 5, controls the movement of the rider bracket within the frame.

The prevent invention fish netting device is a specially designed fish net that enables a aquarium owner to catch fish with the push of a button. The net will eliminate fish jumping out of the net onto the floor during relocation of the fish from one aquarium to the other. Easy net features a net that is connected to a plastic frame. The frame has a rider bracket that slides smoothly along the track. The rider bracket has a second attached to one portion of it and to a portion of the frame. End portions of the rider bracket allow the rider bracket to be permanently positioned within the track of the frame. An elastic string is guided through the channel of the handle and is coupled to the rider bracket. Additionally, a push rod is attached to the lever and is extended through the channel to be attached to the rider bracket. When the lever is pulled backwards, the net is opened, allowing the fish to be retrieved and placed inside the first net member. When the lever is pushed forward, the rider bracket takes the second net member and places it over the top of the first net member, to prevent fish from jumping out of the first net member.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fish netting device for catching fish in an aquarium comprising in combination:

a generally rectangular frame member 12 with a handle 14, the frame member having a front portion 16, a rear portion 18 and a pair of side portions 20 therebetween, the rear portion of the frame having an opening 24 therein and centrally aligned with the handle, the frame member having an interior periphery 26, the interior periphery of the pair of side portions 20 each having an elongated track 28 therein with the elongated track 28 being extended from the front portion to the rear portion;

a first net member 32 being composed of water permeable material intertwined and defining a pocket configuration when interconnected to the frame member;

a linear rider bracket 34 having a pair of end portions 36, the rider bracket being positioned within the frame 12 with each end portion 36 positioned within the track 28 of one of the pair of side portions 20, the rider bracket 34 being parallel to the front and rear portion of the frame, the rider bracket capable of sliding within said tracks between positions adjacent the rear portion and the front portion of the frame, the linear rider bracket being formed from a self-lubricating plastic;

a second net member 38 being composed of water permeable material intertwined, the second net member having a first portion 42 interconnected with the rear portion 18 of the frame, the second net member 38 having a second portion 44 interconnected with the rider bracket 34, the second net member capable of forming a pocket cover when the rider bracket being positioned adjacent the front portion; and the handle 14 having a guide slot 46 and a channel 48, the guide slot being within a top side 52 of the handle and opening into the channel, the channel being extended from the guide slot to the opening of the frame, a lever for moving the rider bracket back forth being positioned within the channel, said lever 54 positioned within the guide slot, said lever connected to an elastic member 56 and a push 58 rod, which are mounted in said channel and connected to said rider bracket for controlling the movement of said rider bracket.

\* \* \* \* \*